Nov. 11, 1958 O. A. HOLLAND 2,859,980
AUTOMATIC FLUID LINE SERVICE COUPLING FOR
TRACTOR-TRAILER VEHICLES
Filed April 28, 1954 5 Sheets-Sheet 1

INVENTOR.
Oswald A. Holland
BY
H. H. Bearinger
ATTORNEYS

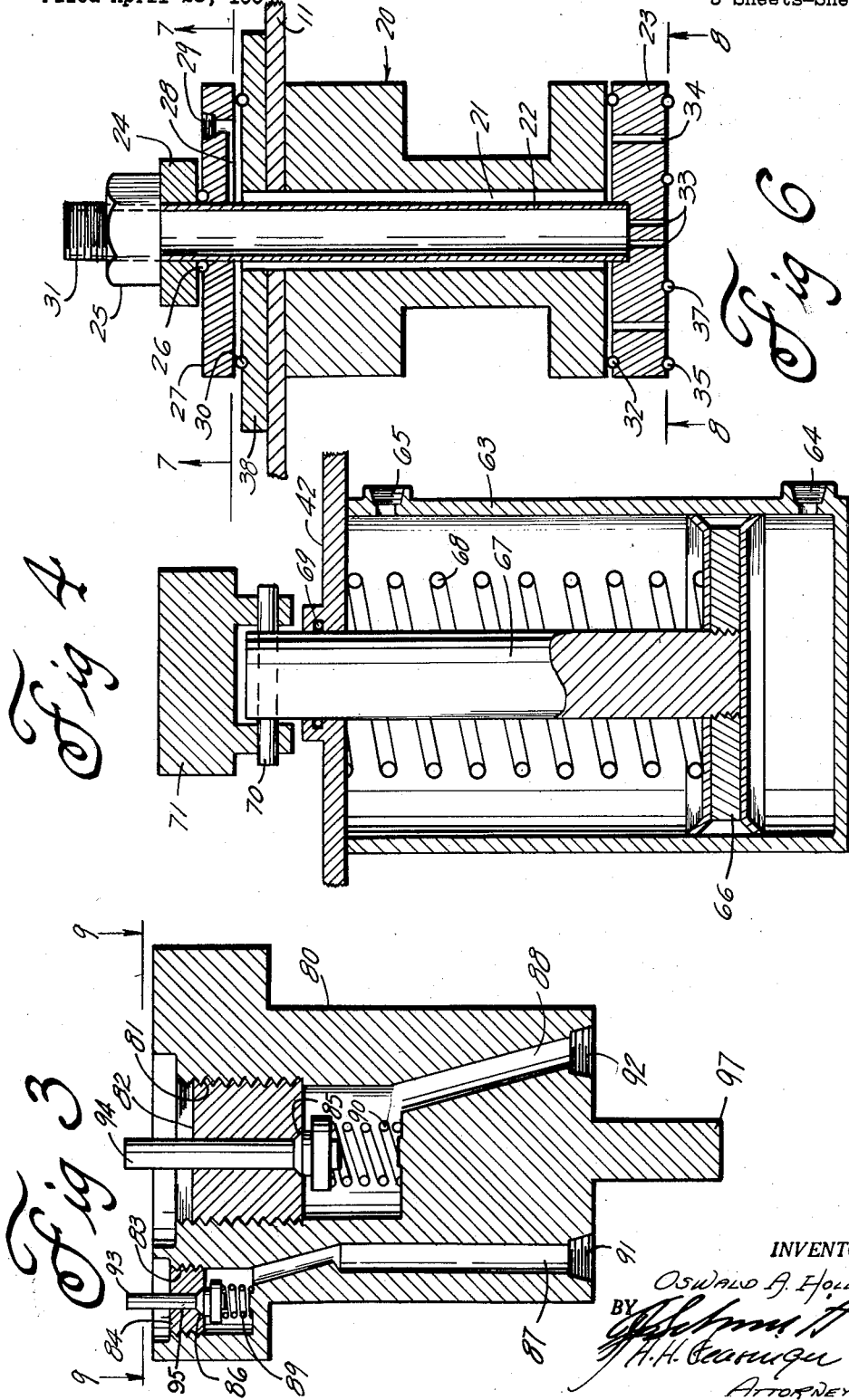

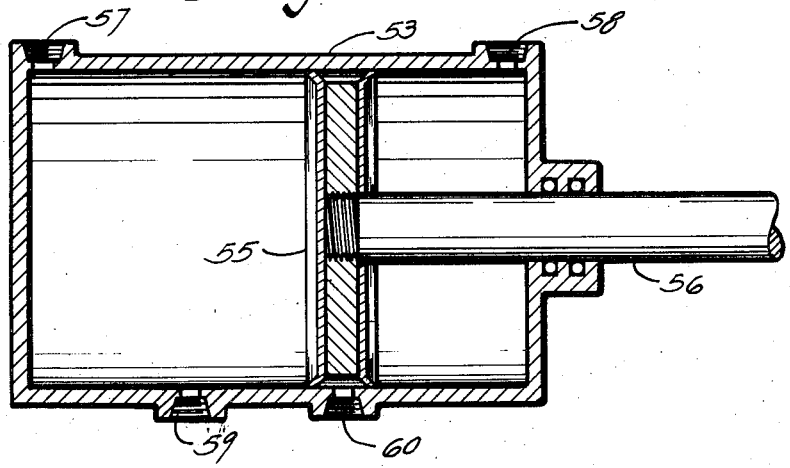
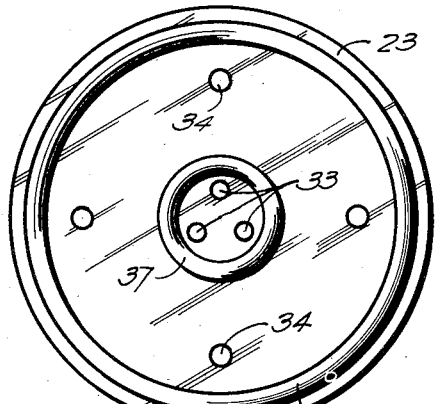
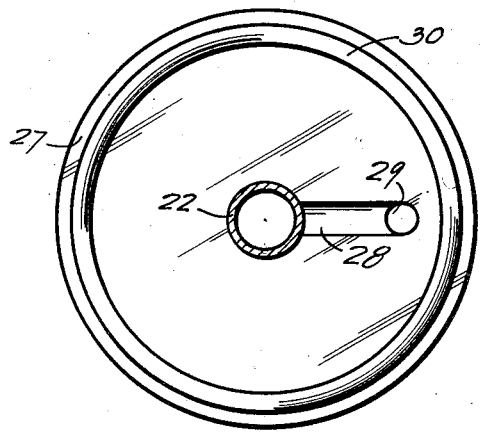

Nov. 11, 1958               O. A. HOLLAND            2,859,980
AUTOMATIC FLUID LINE SERVICE COUPLING FOR
TRACTOR-TRAILER VEHICLES
Filed April 28, 1954                            5 Sheets-Sheet 4
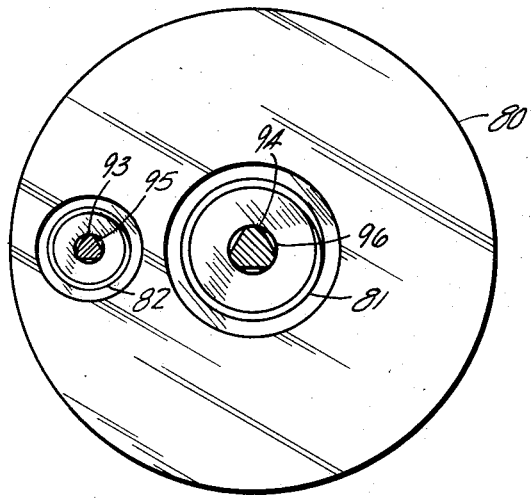
Fig. 9
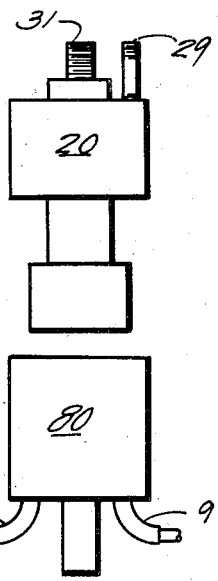
Fig. 10
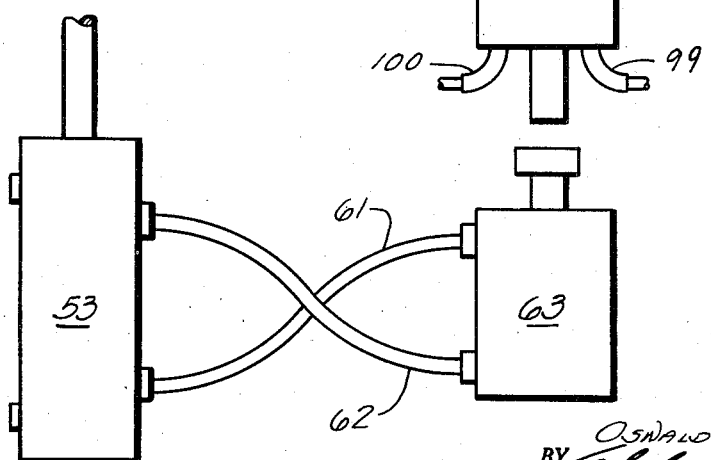
INVENTOR.
Oswald A. Holland
BY
ATTORNEYS Nov. 11, 1958
O. A. HOLLAND
2,859,980
AUTOMATIC FLUID LINE SERVICE COUPLING FOR
TRACTOR-TRAILER VEHICLES
Filed April 28, 1954
5 Sheets-Sheet 5
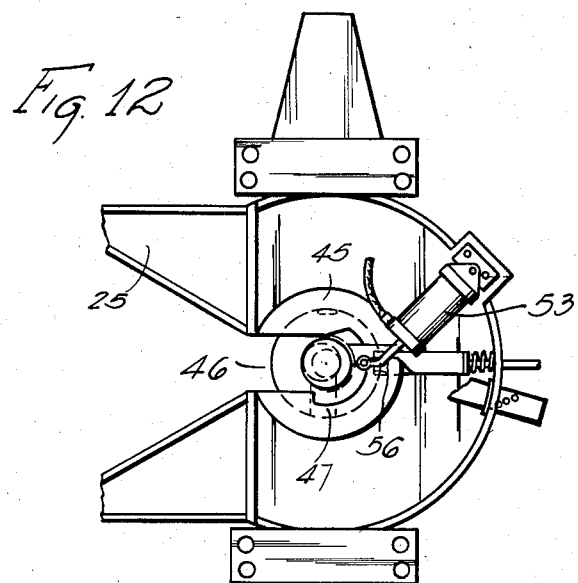
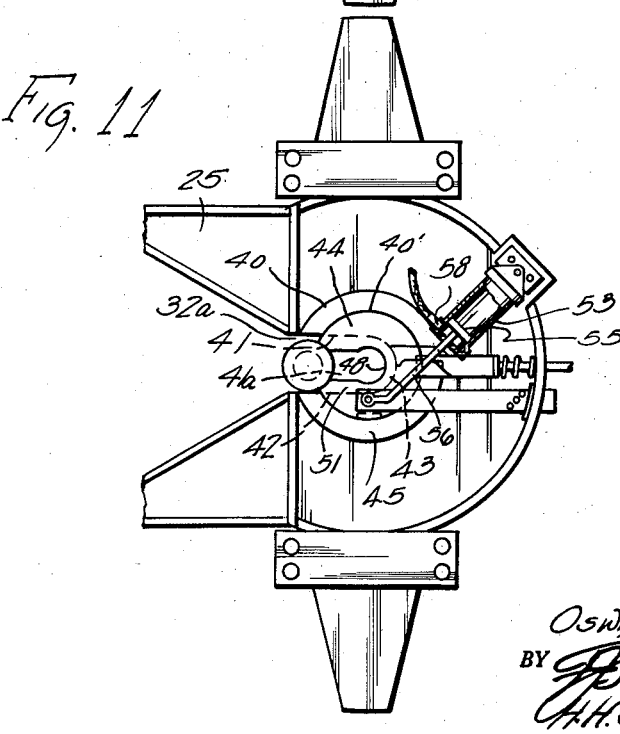
INVENTOR.
OSWALD A. HOLLAND
BY
ATTORNEYS United States Patent Office 2,859,980
Patented Nov. 11, 1958

2,859,980

AUTOMATIC FLUID LINE SERVICE COUPLING FOR TRACTOR-TRAILER VEHICLES

Oswald A. Holland, Hammonton, N. J.

Application April 28, 1954, Serial No. 426,313

7 Claims. (Cl. 280—421)

(Granted under Title 35, U. S. Code (1952), sec. 266)

The invention described herein may be manufactured and used by or for the Government of the United States of America for governmental purposes without the payment of any royalties thereon or therefor.

This invention relates to the art of motor vehicle couplings and deals particularly with mechanisms for accomplishing the automatic coupling and uncoupling of fluid lines extending between a truck-tractor and semi-trailer.

In my patent application Serial No. 302,855 filed August 5, 1952, now abandoned, there is described a fifth wheel coupling unit for a truck-tractor and semi-trailer and the present invention is intended especially for use in conjunction with the apparatus taught therein. However, it is to be understood that the fluid coupling means described herein may be applied to any vehicle by providing the necessary adjuncts, which, in the case of vehicles provided with the novel fifth wheel unit which is the subject of the aforementioned abandoned application, will already be available.

In the ordinary tractor-trailer combination brakes and/or other accessories on the trailer are operated and controlled by air or vacuum supplied from a source of pressure or vacuum on the tractor. The system will be discussed with reference to a pressure system but it is intended that the description will apply equally to a vacuum system or a system wherein some fluid other than air is used as the operating and/or control medium.

There are normally two lines leading from the tractor to the trailer, one being the service line which carries the operating air and the other being the control line. These lines are usually in the form of rubber hoses connected to lines on the trailer by means of appropriate fittings or coupling units supplied on the lines. It is customary for the vehicle operator to connect and disconnect these fittings by hand when the vehicles are coupled or uncoupled. This means that the operator must leave the driver's seat in the cab of the tractor and be exposed to inclement weather conditions or poor footing which may prevail. In addition, it means loss of time. This may be important in an emergency or in shuttling operations in a yard. These lines are relatively fragile and their rupture may be the cause of accident or other loss. For example, a broken service or supply line will cause the trailer brakes to be applied, possibly at an inopportune moment while a broken control line will result in the complete loss of trailer braking.

It is an object of this invention to provide means for automatically completing the coupling and uncoupling of fluid lines extending between a tractor and a trailer.

It is also an object of this invention to place the coupling or uncoupling operation under the control of the driver of the vehicles.

It is a further object of the invention to locate the control means in the cab of the tractor so that the driver may operae them without leaving his seat.

Another object lies in the use of common structure in part to operate and control the fluid coupling and fifth wheel coupling to insure safe sequence of operation and reduce the cost and complexity of the necessary accessories.

It is also an object of this invention to teach an automatic coupling for fluid lines of tractor-trailer combinations which may be applied to existing units with a minimum of cost and effort.

This invention has for an object the development of a fluid coupling between a truck-tractor and semi-trailer which is made through the king pin of the fifth wheel.

This invention has for a further object the provision of a fluid coupling between a tractor and trailer which is substantially hidden from view, is durable, efficient, and safe.

Another object is to provide a fluid coupling between a truck-tractor and semi-trailer which cannot be accidentally or inadvertently uncoupled or left uncoupled when the vehicles are joined in draft relation.

Other objects and many of the attendant advantages of this invention will be readily appreciated as the same becomes better understood by reference to the following detailed description when considered in connection with the accompanying drawings wherein:

Figure 3 is a sectional side elevation of the slidable housing.

Figure 4 is a sectional side elevation of the actuating piston and cylinder.

Figure 5 is a sectional side elevation of the king pin locking means actuating cylinder.

Figure 6 is a sectional side elevation of the trailer carried king pin.

Figure 7 is a view along the line 7—7 of Figure 6.

Figure 8 is a view along the line 8—8 of Figure 6.

Figure 9 is a view along the line 9—9 of Figure 3.

Figure 10 is a schematic presentation of the entire automatic fluid line coupling system.

Figure 11 is a plan view looking from the bottom of the lower fifth wheel with the fifth wheel in position for receiving the trailer king pin.

Figure 12 is a view similar to Figure 11 but with the king pin engaged and with the detent forced out of its notch in the locking plate by the king pin.

Figure 1:
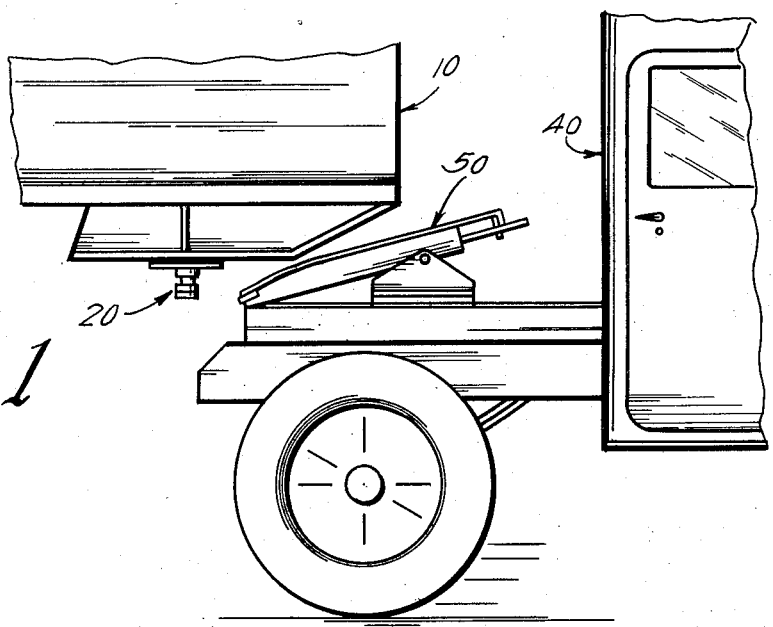
Figure 1 is a side elevation of a tractor-trailer unit wherein the trailer is in a position to be connected to or disconnected from the tractor.
Figure 2:
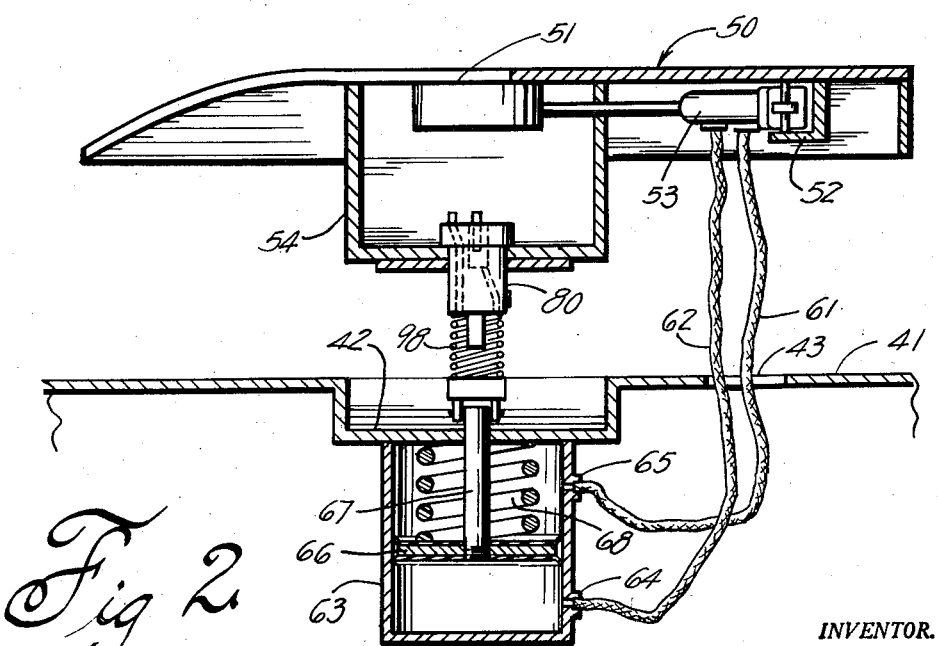
Figure 2 is a side view of a portion of the tractor and its fifth wheel structure showing the tractor carried portion of the automatic fluid line coupling means with some parts in section.

Figure 1 illustrates the environment in which my invention is to be utilized. The trailer, indicated by the reference numeral 10 is to be coupled on to the tractor 40 and is to be drawn thereby. The coupling is achieved by placing the king pin 20 on the trailer in the tractor carried fifth wheel 50 and securing it therein. The particular means for accomplishing this forms no part of this invention and may consist of those devices which are well known in the art or the fifth wheel coupling unit disclosed in my abandoned application Serial No. 302,855.

Carried on the bed 41 of the tractor 40 is the fifth wheel structure 50 which includes a king pin receiving and locking means 51. A fluid actuated hydraulic means (see Figure 5) is supported by a bracket 52 on the fifth wheel and includes a cylinder 53 in which the piston 55 moves. The piston has connected thereto the piston rod 56 which is connected at its other end to the king pin locking means. This actuator is of the double acting type and is provided with ports 57 and 58 which are connected by suitable means well known in the art to a source of fluid and suitable controls also well known in the art. Control means for this hydraulic actuator are placed in the cab of the tractor. A pair of ports 59 and 60 on a side of the cylinder 53 opposite the ports 57 and 58 have connected thereto the flexible lines 61 and 62.

Referring to Figures 11 and 12, the king pin locking means is shown to comprise a circular center plate disc 40 having a circular recess 40' concentric therewith and extending through about half the thickness of the center plate. A slot 41a is bounded by walls 41, 42 closed at one end by a semicircular wall 43 formed in the center plate and coincides substantially with slot 32a in plate 25. A locking plate 44 is rotatably fitted into the circular recess of the center plate and is retained therein by a cover plate 54. A slot 46, substantially coinciding with the slots in the bearing plate 25 and the center plate 40, is provided in the cover plate and a slot 47 of a width corresponding substantially to the diameter of the reduced portion of king pin 20 is formed in the locking plate. This slot 47 merges into an arcuate wall 48 which has a diameter slightly larger than the width of slot 47.

Rigidly mounted beneath the bed 41 of the tractor is the automatic fluid line coupler actuating motor cylinder 63 (see Figure 4). This cylinder receives actuating fluid through the lines 61 and 62 which pass through the opening 43 in the bed 41 and are coupled to the ports 64 and 65 on the cylinder 63. A piston 66 is provided in the cylinder 63 and carries a piston rod 67. The piston rod passes out of the upper end of the cylinder which has a sealing means 69 surrounding the rod. A spring 68 acts between the upper surface of the cylinder and the upper surface of the piston to aid in returning the piston to the lower end of the cylinder.

Pivotally supported on the upper end of the piston rod 67 by means of the pin 70 is the cross head or block 71. When the piston is forced upwardly the block 71 rises to contact the projection 97 on the housing 80. It is guided in its upward movement by the coil spring 98 which also serves to keep housing 80 in its proper position.

The fifth wheel 50 is provided with a box like supporting structure 54 on its under surface. Slidably mounted in an aperture in the support 54 is the housing 80 which receives the fluid for the brake supply source and the brake control source and transmits it to means carried by the trailer. The housing 80 is disclosed as being circular in cross-section but this is merely a preferred form and it is not limited to this construction. An enlarged portion at its upper end prevents it from passing all the way through the opening in the support 54.

On its upper end the housing is provided with a centrally located counterbore 81 which is internally threaded for some portion of its length. A similar counterbore 83 smaller in size and positioned off to one side of the housing is also provided with internal threads. Threaded into each of the counterbores 81 and 83 are plugs 82 and 84, respectively, each plug being provided a passage at its center extending completely therethrough. Valves 85 and 86 are seated in the bottom of each plug 83 and 84, respectively and are held in closed positions by means of the coil expansion springs 90 and 89, respectively which act between the end of the valves and the bottom of the counterbores. A passage 88 extends from the bottom of the counterbore 81 to the bottom of the housing or contact element 80 and is provided at its lower end with means 92 for connection to a line in which fluid may flow. A similar passage 87 is provided for the counterbore 82 along with a like connecting means 91. The outlets for each of these passages are on opposite sides of the projection 97 so that connection may be made to the fluid flow lines with a minimum of interference. The valve 85 has a plunger operator 94 extending upwardly therefrom through the passage in the plug 82. A similar plunger operator 93 extends through the bore in the plug 84 for the valve 86. In Figure 9 it will be seen that the valve plunger operators are substantially triangular in cross-sectional configuration so that passages 95 and 96 will be provided for the flow of fluid when the plungers are depressed to open the valves.

The king pin 20 is mounted on a structural element 11 of the trailer coupling means. A bore 21 extends through the length of the king pin and has a pipe section or tube 22 positioned therein so that two concentric fluid flow passages are formed. The lower end of the tube has a round plate section fixedly secured thereto by any suitable means and the upper end thereof passes through an aperture in a plate 38. Imbedded in the plate 38 is a sealing ring 30 of the type well known in the art. Resting on top of the sealing ring 30 is a plate 27 which because of the ring 30 has its bottom spaced some distance from the plate 38 to form a chamber for the flow of fluid. A grooved portion 28 is also provided in the plate 27 from the center thereof radially to where it makes contact with the threaded port 29. The chamber and groove thus provided constitute a means whereby fluid may pass from the outer of the two concentric fluid flow passages in the body of the king pin to the outlet 29. A second sealing ring 26 is provided on the upper surface of the plate 27 and is held in place by the collar 24 mounted on the tube 22 by means of the nut 25 threaded on to the upper end of the tube. The threads 31 on the upper end of the tube in addition to providing securing means for the nut 25 also furnish a means whereby a connection may be made to the braking system of the trailer. The connection 29 serves a similar purpose.

The lower plate 23 on the end of the tube 22 has a sealing ring 32 imbedded in its upper surface and is thereby spaced from the bottom of the king pin to form a chamber leading to the outer concentric passage. A plurality of small holes 34 is provided from the upper surface of the plate 23 to its bottom. A plurality of similar holes 33 is likewise provided at the center of the plate at 33. A sealing ring 37 is embedded around the holes 33 to divide the plate 23 into two separate areas for a purpose to be brought out later on in the specification. A larger sealing ring 35 is embedded adjacent the periphery of the plate, also for a purpose to be brought out later.

The relationship of the various elements when they are in a position to be operated is shown in Figure 10. The coupling means 100 on the housing 80 is connected to the control line on the tractor while the coupling means 99 is connected to the tractor supply line.

In operation, the device performs in the following manner: The tractor is backed up to the trailer and king pin 20 is placed in the fifth wheel 50 in the manner well known in the art. In the case of coupling units equipped with an automatic coupler such as disclosed in my abandoned application Serial No. 302,855 where there is a fluid operated cylinder to lock the king pin in the fifth wheel, the operation of automatic fluid line coupler will be as set out below; but where there is no such operating cylinder for the locking means, all that is required is the provision for a fluid source and control means for the actuating cylinder 63 of the automatic fluid line coupler; otherwise, the operation of the device is the same.

After the king pin has been placed in the fifth wheel, fluid such as air or oil is admitted to the pipe tap 58 causing the piston 55 to move toward the left hand side of the cylinder 53 as shown in Figure 5. Movement of piston 55 simultaneously actuates rod 56; rod 56 is retracted from the position of Figure 11 to that of Figure 12. Retraction of the rod rotates locking plate 40 and the king pin is now held in its locked position. It is thus seen that the braking control hookup is not commenced until the king pin is locked by the rotation of plate 40 actuated by piston 55. The sequence of operation, hereinafter described, is automatically set into operation upon the completion or partial completion of the locking sequence as port 60 cannot be uncovered by piston 55 if the kingpin is not in the process of being locked, i. e. if a jamming occurs. Upon moving some distance in the cylinder, the piston passes the port 60 opening it up to the passage of fluid therethrough. This delay in furnishing fluid through the port 60 is provided so that the locking of the king pin in the fifth wheel will be complete before the automatic coupler begins to operate—this feature serving as a safety factor. The fluid passes through the port 60, line 62 and through the port 64 in the bottom of cylinder 63 forcing the piston 66 upwardly. The cross head 71 moved upwardly by virtue of the upward movement of the piston rises, contacts the housing 80 and forces it up so its upper surface moves into proximity to the bottom of the king pin 20 which is now depending downwardly through the locking means 51. The plungers 93 and 94 which project above the upper surface of the housing engage the bottom of the king pin and are depressed thereby since the king pin cannot rise, it being fixed to the trailer structure.

The depression of the plunger 93 and 94 causes the valves 85 and 86 to open and permits fluid to flow in the following manner: Fluid flows from the control line on the tractor through the hose 100, passage 87 and passage 95 formed in the bore in plug 84 as consequence of space left in this round bore by the triangular plunger 83. Since upward movement of the housing has depressed the plungers, the upper surface of the housing has contacted the lower surfaces of the sealing rings 35 and 37 forming two concentric chambers, one, an inner, bounded by the inner surface of the sealing ring 37 and the other, an outer, bounded by the outer surface of the sealing ring 37 and the inner surface of the sealing ring 35. The holes 34 are all provided in this outer chamber and communicate with the chamber between the upper surface of the plate 23 and the king pin. The fluid emanating from the passages 95 passes into this outer chamber, through the holes 34, into the chamber between the plate 23 and the king pin, up the outer concentric bore in the king pin, into the chamber between plates 27 and 38 and groove 28, through outlet 29 and from thence through a suitable connection to the brake control system of the trailer. It is to be noted that the holes 34 in plate 23 are smaller than the plunger 93 so that it will not enter therein but is rather certain to be depressed by the lower surface of plate 23.

The hose 99 is connected to the fluid supply for activating the brakes and the fluid from this source will pass through the passage 88, passages 96 in the plug 82, the inner chamber between housing 80 and plate 23, through the holes 33, up the pipe 22, through the outlet 31 and to suitable connections on the trailer to brake fluid supply tank.

Thus there is provided a completely automatic coupling means for fluid activated brakes for the trailer of a tractor-trailer unit. By this system, it is possible for the operator of the unit when using this invention and the automatic coupling means disclosed in my abandoned application, Serial No. 302,855 to couple the trailer on to the tractor and the brake lines without having to leave his cab, thereby avoiding the dangers associated with such movement and affording a considerable saving of time and other conveniences.

The uncoupling of the fluid lines is similarly automatic and is accomplished in the following manner. The control system for the locking means actuating cylinder 53 is reversed so that fluid is admitted through port 57 forcing the piston 55 toward the right hand side of Figure 5. After some movement in this direction, the piston passes port 59 permitting fluid to flow through line 61 and port 65 to the upper surface of piston 66 whereby through this means and with the aid of spring 68, the piston is retracted and the housing 80 slides downwardly away from contact with the king pin. The valves 85 and 86 are closed by the action of the springs 89 and 90. This operation is completely automatic and all connections between the tractor and the trailer are broken.

Obviously many modifications and variations of the present invention are possible in the light of the above teachings. It is therefore to be understood that within the scope of the appended claims the invention may be practiced otherwise than as specifically described.

What is claimed is:

1. In automatically operated fluid line coupling means for tractor-trailer units a housing slidably mounted on the tractor fifth wheel structure; said housing having a centrally located counterbore formed therein; a second counterbore eccentrically formed in said housing; said housing having a passage extending from the bottom of each of said counterbores to an outer surface of said housing; fluid flow control means mounted in said counterbores; a portion of the tractor-trailer coupling means mounted on the trailer being provided with a pair of fluid flow passages which extend through said coupling means portion; and means responsive when the trailer is mechanically locked onto the tractor for slidably moving the housing into fluid sealed engagement with a peripheral portion of the tractor-trailer coupling means such that the passages of the coupling means are in alignment and fluid communication with the counterbores and passages of the housing.

2. In automatically operated fluid line coupling means as defined in claim 1 wherein the means for slidably moving the housing comprises a fluid operated plunger operatively connected to the housing; and means to supply fluid to said plunger when the trailer is locked onto the tractor.

3. In automatically operated fluid line coupling means as defined in claim 1 wherein the fluid flow control means comprises plunger operated valves; said valves being opened by said trailer mounted tractor-trailer coupling portion when said openings and said counterbores are juxtaposed with each other.

4. In automatically operated fluid flow line coupling means as defined in claim 3 wherein the means for slidably moving the housing comprises a fluid operated plunger and means associated with the tractor-trailer coupling means to automatically supply fluid to said plunger when the trailer is locked onto the tractor.

5. An automatically operated fluid line coupling means for tractor-trailer units comprising a housing slidably mounted on the tractor fifth wheel structure; a centrally positioned counterbore formed in the top of said housing; a second counterbore eccentrically formed in said housing; each counterbore being provided with internal threads; an apertured plug threaded into each counterbore and spaced from the bottom of each counterbore; a valve seat formed on the bottom of each plug; a valve positioned to rest in each seat; spring means acting between the bottom of each counterbore and each valve; a plunger extending from each valve and passing through the aperture in each plug; passages formed in said housing and extending from the bottom of said counterbore to the bottom of said housing; a trailer carried portion of the tractor-trailer coupling means being provided with a plurality of passages; said passages overlying the counterbores when said housing is slid upwardly to engage the bottom of the trailer coupling portion; means at the upper end of the trailer carried portion of the coupling means and the lower end of the housing passages to which fluid flow lines may be connected; fluid operated piston and cylinder means mounted on the tractor below the housing and capable of being extended to engage said housing whereby said housing may be slid upwardly to contact the bottom of said trailer carried portion of the coupling means and said plungers will be depressed opening said valves; means responsive to actuation of mechanical tractor-trailer coupling means to automatically supply fluid to said piston and cylinder means to cause the extension thereof.

6. An automatically fluid line coupling means as defined in claim 5 wherein said plungers are substantially triangular in cross-sectional configuration and are of size larger than the passages in said trailer carried portion of the tractor-trailer coupling means so that they will not enter therein.

7. In combination with a tractor-trailer coupling means including a trailer carried kingpin and a tractor carried fluid operated cylinder to actuate a king pin locking means; fluid line coupling means comprising a housing slidably mounted on the tractor carried fifth wheel structure; said housing having fluid flow passages formed therein; fluid flow control means mounted in said passages; fluid flow passages formed in said kingpin and positioned to form a continuous fluid flow means when juxtaposed to said housing passages; fluid operated piston and cylinder means mounted on the tractor and positioned to engage said housing to slide it upwardly when the piston and cylinder means is extended; fluid lines connecting the housing sliding piston and cylinder means and the kingpin locking means actuating cylinder and positioned in said latter cylinder whereby housing sliding piston and cylinder means will be actuated after the kingpin has been locked onto the tractor.

References Cited in the file of this patent

UNITED STATES PATENTS

| | | |
|---|---|---|
| 1,765,634 | Stewart | June 24, 1930 |
| 1,766,780 | Finch | June 24, 1930 |
| 1,932,091 | Stevens | Oct. 24, 1933 |
| 2,043,610 | Eaton | June 9, 1936 |
| 2,053,614 | Johnson | Sept. 8, 1936 |
| 2,457,478 | Letvin | Dec. 28, 1948 |